United States Patent

Fleming et al.

[11] Patent Number: 5,339,022
[45] Date of Patent: Aug. 16, 1994

[54] CAPACITIVE CABLE LENGTH INDICATOR

[75] Inventors: David F. Fleming, Palmyra; James M. Raudenbush, Middletown; Raymond M. Carlisle, Loysville, all of Pa.

[73] Assignee: The Whitaker Corporation, Wilmington, Del.

[21] Appl. No.: 950,369

[22] Filed: Sep. 24, 1992

[51] Int. Cl.⁵ .............................................. G01R 27/26
[52] U.S. Cl. ....................................... 324/67; 324/662; 324/681; 324/690
[58] Field of Search ................. 324/67, 658, 662, 678, 324/681, 690; 379/23, 26

[56] References Cited

U.S. PATENT DOCUMENTS

| | | | |
|---|---|---|---|
| 2,285,152 | 6/1942 | Firestone | 175/183 |
| 2,601,649 | 6/1952 | Wadman | 175/183 |
| 3,651,505 | 3/1972 | Schmidt | 340/200 |
| 3,781,672 | 12/1973 | Maltby et al. | 324/61 R |
| 3,821,659 | 6/1974 | Ludwig | 331/65 |
| 3,879,660 | 4/1975 | Piso | 324/61 R |
| 3,987,392 | 10/1976 | Kugelmann et al. | 324/96 |
| 4,103,225 | 7/1978 | Stephens | 324/678 |
| 4,199,984 | 4/1980 | Huddart et al. | 324/678 X |
| 4,459,541 | 7/1984 | Fielden et al. | 324/678 |
| 4,517,547 | 5/1985 | Gray et al. | 324/665 X |
| 4,812,752 | 3/1989 | Preuss | 324/542 |
| 4,820,991 | 4/1989 | Clark | 324/519 |
| 4,907,449 | 3/1990 | Call et al. | 73/170.28 |

Primary Examiner—Kenneth A. Wieder
Assistant Examiner—Christopher M. Tobin

[57] ABSTRACT

A cable length indicating arrangement which utilizes the capacitance of a two wire cable (10) to determine its length. The arrangement includes an oscillator stage (14) having a frequency setting capacitor (16) across which the cable is connected. The frequency of oscillation is converted into a voltage which is provided as the input to a comparator network (70, 72, 74, 76, 78, 80) which compares this voltage against voltages derived from a voltage divider network (96, 98, 100, 102, 104, 106, 108). The comparator network includes a "ladder" of comparators each having their non-inverting inputs coupled to receive the frequency dependent voltage and their inverting inputs each connected to a respective point in a resistive divider string. The outputs of the comparators are connected to respective light emitting diodes (82, 84, 86, 88, 90, 92). As the length of the cable is increased and its capacitance increases, the frequency of oscillation decreases, the frequency dependent voltage decreases, and the light emitting diodes are energized one by one, to provide a bar graph display indicative of cable length.

8 Claims, 2 Drawing Sheets

CAPACITIVE CABLE LENGTH INDICATOR

BACKGROUND OF THE INVENTION

This invention relates to an arrangement for indicating the length of a cable and, more particularly, to such an arrangement wherein only one end of the cable is required to be accessed.

When working with wiring within a building, it is often necessary to know the overall length of a particular cable between its termination at a wiring closet and its remote end. This is particularly true with Type I cable (i.e., shielded twisted pair) when CATV signals are to be transmitted over the cable so that appropriate amplification of the CATV signals can be effected. Since the cable is usually not visible or accessible over its entire length, a physical measurement of the length of the cable is not possible. It is therefore an object of the present invention to provide an arrangement for indicating the length of a cable which does not rely upon the entire cable length being visible and accessible.

It has heretofore been proposed to use cable resistance as an indicator of cable length. However, in order to effectively measure the cable resistance, connections must be made at both ends of the cable. Thus, for a two wire cable, the two wires at the remote end must be connected together and then a resistance measurement is made from the near end. This is disadvantageous in that it requires personnel to travel to the remote end of the cable, identify the specific cable wires, and make the connection. After the resistance measurement is made, the remote ends of the cable wires must be disconnected. It is therefore a more specific object of this invention to provide an arrangement for indicating the cable length while only requiring the cable to be accessed from one end.

SUMMARY OF THE INVENTION

The foregoing and additional objects are attained in accordance with the principles of this invention by providing an arrangement for indicating the length of a cable having a capacitance which is a direct function of the cable length. The arrangement includes an electrical oscillator stage which has a frequency setting capacitor. One of the cable wires is connected to a first side of the capacitor and the other of the cable wires is connected to the other side of the capacitor. A voltage is provided which corresponds to the frequency of oscillation of the oscillator stage and a visual representation of the voltage is displayed.

In accordance with an aspect of this invention, the display includes a linear array of light emitting diodes which are sequentially energized as a function of the frequency dependent voltage to provide a bar graph display indicative of cable length.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
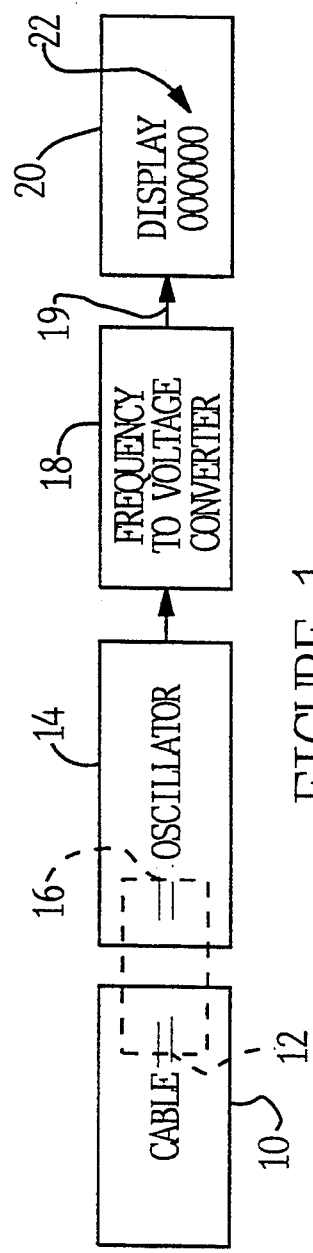
FIG. 1 is an overall block diagram of a cable length indicating arrangement constructed according to this invention.

Referring to the drawings, FIG. 1 illustrates a two wire cable 10 shown by the broken lines as having a capacitance 12. The value of the capacitance 12 is directly proportional to the length of the cable 10. The inventive arrangement includes an electrical oscillator stage 14 which has a frequency setting capacitor 16 therein. The wires of the cable 10 are connected one to each side of the capacitor 16 so that the effective frequency setting capacitance seen by the oscillator 14 is the parallel combination (i.e., the sum) of the capacitances 12 and 16. Thus, the longer the cable 10, the higher the capacitance seen by the oscillator 14. The oscillator 14 is arranged to provide an oscillating signal output at a frequency which is inversely related to the effective capacitance which it sees. Therefore, the longer the cable 10, the lower the frequency of oscillation of the oscillator stage 14. A frequency to voltage conversion stage 18 is provided which is coupled to receive the oscillating signal output of the oscillator stage 14. The frequency to voltage converter 18 provides a voltage on the lead 19 which is directly related to the output frequency of the oscillator stage 14. This voltage is provided as an input to the display 20. The display 20 includes a linear array of light emitting elements 22 and is arranged to energize the light emitting elements 22 in dependence on the voltage received on the lead 19 from the frequency to voltage converter 18 so that there is provided a bar of light extending in direct dependence on the received voltage. Thus, the length of the bar of light is a direct representation of the length of the cable 10.

Figure 2:
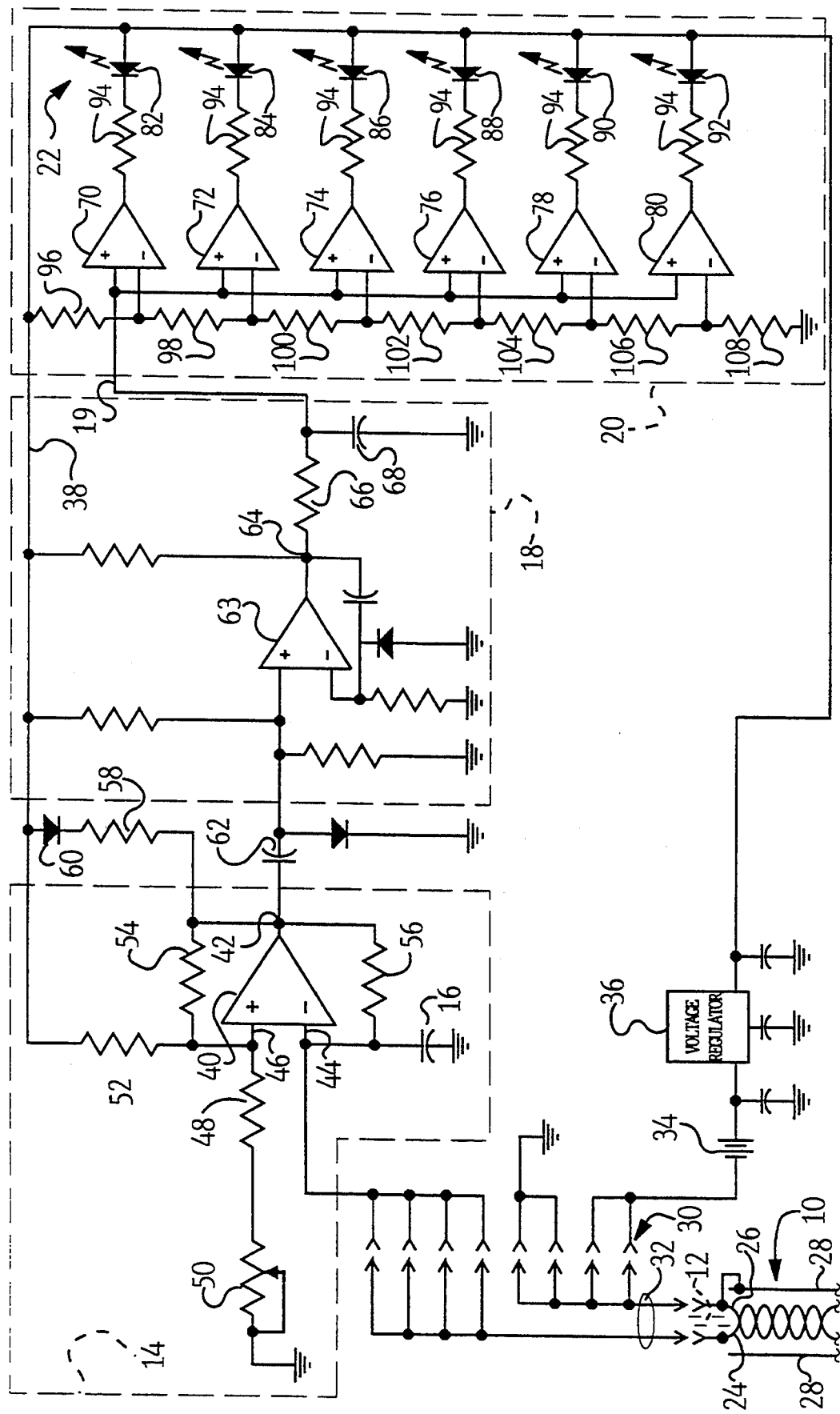
FIG. 2 is a detailed schematic diagram of an embodiment of circuitry constructed according to this invention for implementing the block diagram of FIG. 1.

FIG. 2 shows a detailed schematic diagram of illustrative electrical circuitry for implementing the block diagram of FIG. 1. As shown, the cable 10 is a Type I shielded twisted pair cable having a first wire 24 and a second wire 26. The first and second wires 24, 26 are insulated from each other, twisted about each other, and enclosed within a shield 28 over the entire length of the cable 10. As shown by the broken line representation, the cable 10 has an effective capacitance 12 between the wires 24 and 26.

The inventive arrangement is designed to be a self contained and handheld cable length indicator. Accordingly, it is provided with a modular jack 30 to which may be connected a pigtail stub 32. When a cable 10 is to have its length displayed, the cable wires 24 and 26 are connected to the pigtail stub 32. This may be effected in any convenient fashion, such as for example, by means of alligator clips secured to the pigtail stub 32. At the same time, the shield 28 is connected to the second cable wire 26. The pigtail stub 32 is then inserted into the modular jack 30. As will be apparent from the following discussion, no further operator action is required other than viewing the display 20.

The cable length indicator is provided with a battery 34, illustratively a nine volt battery, which, through the voltage regulator 36, provides a six volt supply voltage on the supply line 38. The voltage return is shown by the ground symbol, although it is understood that the handheld cable length indicator may not actually be grounded. In this regard, the negative terminal of the battery 34 is floating until the pigtail stub 32 is mated to the modular jack 30. As shown in FIG. 2, the pigtail stub 32 includes a jumper which connects the negative terminal of the battery 34 to the ground return. Thus, the coaction of the pigtail stub 32 with the modular jack 30 functions as the on/off power switch of the inventive cable length indicating arrangement.

The oscillator stage 14 illustratively comprises a comparator 40 having an output terminal 42, an inverting input terminal 44 and a non-inverting input terminal 46. The series connection of the resistor 48 and the potentiometer 50 couple the non-inverting input terminal 46 to ground. A resistor 52 couples the non-inverting input terminal 46 to the supply line 38 and the resistor 54 couples the non-inverting input terminal 46 to the output terminal 42. The resistor 56 couples the inverting input terminal 44 to the output terminal 42. A first side of the capacitor 16 is coupled to the inverting input terminal 44 of the comparator 40 and the second side of the capacitor 16 is coupled to ground. When the cable 10 is connected to the pigtail stub 32 and the pigtail stub 32 is mated with the modular jack 30, two connections are made. First, the effective capacitance 12 between the cable wires 24 and 26 is connected across the capacitor 16 of the oscillator 14. Second, the negative terminal of the battery 34 is connected to ground so that an effective voltage is provided on the supply line 38 to enable operation of the cable length indicating arrangement.

With a supply voltage provided on the supply line 38, the voltage at the non-inverting input terminal 46 of the comparator 40 is initially higher than the voltage at the inverting input terminal 44, due to the voltage dividing action of the resistors 52 and 48, 50. Therefore, the voltage at the output terminal 42 is high. This causes the parallel capacitors 16 and 12 to charge through the resistor 56. When the voltage at the first end of the capacitor 16 and on the cable wire 24 increases to a level where it exceeds the voltage at the non-inverting input terminal 46, the output terminal 42 of the comparator 40 goes low. This causes the parallel capacitances 16 and 12 to discharge through the resistor 56. When the capacitors 16 and 12 discharge sufficiently, the state of the comparator 40 switches again, causing its output terminal 42 to go high. It is noted that the comparator 40 oscillator connection exhibits a hysteresis effect, as is conventional, so that the voltage levels at which the comparator 40 changes state are separated by a hysteresis voltage. Thus, a square wave oscillating signal is provided on the output terminal 42.

The frequency of this oscillating signal on the output terminal 42 is determined by the value of the parallel capacitances 16 and 12. A higher value of capacitance results in longer charge and discharge times than a lower value of capacitance so that the frequency of the square wave at the output terminal 42 is inversely related to the parallel capacitances 16 and 12. Since the capacitor 16 is fixed and the value of the capacitor 12 is directly related to the length of the cable 10, it is seen that the frequency of the oscillating signal on the output terminal 42 is in inverse relation to the length of the cable 10.

Preferably, the value of the capacitor 16 is chosen to be substantially the same as the value of the capacitance 12 when the length of the cable 10 is midway in the range of lengths to be measured. Thus, if it is desired to indicate the length of the cable between 0 and 120 meters, it has been found that a 60 meter length of cable 10 has a capacitance of approximately 3300 picofarads. Accordingly, for such a range, the value of the capacitor 16 is chosen to be 3300 picofarads. With this value of capacitance, and appropriately chosen resistor values, the frequency of oscillation of the oscillator stage 14 is approximately 2.5 kilohertz when the attached cable 10 has a length of 60 meters. If the length of the cable 10 is increased to 120 meters, the frequency of oscillation drops to about 1.6 kilohertz. At the other extreme, with only the pigtail stub 32 connected (i.e., without any length of cable 10), the frequency of oscillation increases to about 5 kilohertz. The series combination of the resistor 58 and the light emitting diode 60 is connected between the output terminal 42 of the comparator 40 and the supply line 38. The light emitting diode 60 is then energized when the output terminal 42 is low and is not energized when the output terminal 42 is high. Therefore, the light emitting diode 60 provides a flickering indication at the frequency of oscillation of the oscillator 14, to indicate that a cable is connected to the cable length indicating arrangement.

The square wave output of the comparator 40 is coupled through the capacitor 62 to the frequency to voltage conversion stage 18. The frequency to voltage converter 18 illustratively comprises a one-shot multivibrator circuit followed by an integrator circuit. The one-shot multivibrator circuit includes the comparator 63 and associated resistors and capacitors, as is conventional. The output of the one-shot multivibrator on the lead 64 is a single fixed time pulse for each cycle of the output of the oscillator stage 14. The higher the frequency of oscillation of the oscillator 14, the closer that the pulses on the lead 64 appear. These pulses are integrated by the integrator circuit made up of the resistor 66 and the capacitor 68 to provide a voltage on the lead 19 which is directly related to the frequency of oscillation of the oscillator 14. Thus, the closer that the pulses on the lead 64 are, the higher the voltage on the lead 19. Therefore, the voltage on the lead 19 is inversely related to the length of the cable 10.

The cable length dependent voltage on the lead 19 is applied as an input to the display 20. The display 20 comprises a plurality of comparators 70, 72, 74, 76, 78 and 80 each having an output terminal, an inverting input terminal and a non-inverting input terminal. The non-inverting input terminals of the comparators 70–80 are all connected together to receive the voltage on the lead 19. The linear array 22 of light emitting elements includes the light emitting diodes 82, 84, 86, 88, 90 and 92. The light emitting diodes 82–92 have their anodes connected together and to the supply line 38 and each has its cathode coupled to the output terminal of a respective one of the comparators 70–80 through a respective current limiting resistor 94.

The inverting inputs of the comparators 70–80 are connected to respective points in a resistive divider network. The resistive divider network includes the series connection of the resistors 96, 98, 100, 102, 104, 106 and 108 connected between the supply line 38 and ground. Thus, the inverting input of the comparator 70 is connected to the junction between the resistors 96 and 98; the inverting input of the comparator 72 is connected to the junction between the resistors 98 and 100; the inverting input of the comparator 74 is connected to the junction between the resistors 100 and 102; the inverting input of the comparator 76 is connected to the junction between the resistors 102 and 104; the inverting input of the comparator 78 is connected to the junction between the resistors 104 and 106; and the inverting input of the comparator 80 is connected to the junction between the resistors 106 and 108. Therefore, each of these junction points defines a different voltage trigger point for the respective one of the comparators 70–80. The values of the resistors 96–108 are chosen so that the switching points of the comparators 70–80 correspond to 20 meter increments in length of the cable 10.

In operation, if only the pigtail stub 32 without an attached cable 10 is mated to the modular jack 30, the oscillator 14 will provide a square wave output at a frequency of about 5 kilohertz, as previously described. This will cause the highest possible voltage for any cable length to appear on the lead 19. The potentiometer 50 is adjusted so that the light emitting diode 82 is only very dimly lit, with the diodes 84–92 not being energized. Thus, the potentiometer 50 is utilized to calibrate the cable length indicating arrangement for the zero meter cable length threshold. With the cable 10 connected to the pigtail stub 32, the frequency of oscillation of the oscillator stage 14 will decrease, thereby lowering the voltage on the lead 19. This voltage is compared with the voltages at the junctions of the resistive divider network made up of the resistors 96–108. As the voltage on the lead 19 decreases, first the comparator 70 has a low output, then the comparator 72 has a low output, etc., thereby lighting first the light emitting diode 82, then the light emitting diodes 82 and 84, then the light emitting diodes 82, 84 and 86, etc., in 20 meter increments of the length of the cable 10. Since the light emitting diodes 82–92 are positioned in a linear array, there is provided a bar graph type visual indication of the length of the cable 10.

The described circuitry also provides a low battery indication. As the voltage of the battery 34 drops due to age, its internal resistance increases. The voltage regulator 36 provides a six volt supply on the supply line 38, assuming that the battery 34 provides nine volts. However, once the voltage of the battery 34 drops below about 6.5 volts, the voltage on the supply line 38 drops, thereby lowering the voltage on the lead 19. Assuming that only the pigtail stub 32 is connected, only the light emitting diode 82 is dimly lit, as described above. However, due to the lowering of the voltage on the supply line 38 and the increased internal resistance of the battery 34, the light emitting diode 82 will draw more current and lower the battery voltage even more thereby changing the operating points of the comparators 70–80. The other light emitting diodes 84–92 will then be energized one by one in an avalanche effect. Thus, in summary, if only the pigtail stub 32 is connected to the cable length indicating arrangement and all of the light emitting diodes 82–92 are lit, this indicates a low battery condition.

The described circuitry further provides an indication of a short circuit in the cable 10. In such a circumstance, the capacitor 16 will be short circuited and the oscillator stage 14 will not oscillate because the inverting input terminal 44 of the comparator 40 is grounded. Therefore, the output terminal 42 will remain high and the light emitting diode 60 will not be lit. The output lead 64 of the one-shot multivibrator circuit will remain grounded so that zero volts appears on the lead 19. This will cause all of the light emitting diodes 82–92 to be lit. Accordingly, there is the anomalous condition that the display will indicate 120 meters of cable length while the "on" indicator of light emitting diode 60 is out. This anomalous condition indicates a shorted cable.

Accordingly, there has been disclosed an improved cable length indicating arrangement. While an exemplary embodiment has been disclosed herein, it will be appreciated by those skilled in the art that various modifications and adaptations to the disclosed embodiment may be made but it is only intended that this invention be limited by the scope of the appended claims.

We claim:

1. An arrangement for indicating the length of a cable (10) made up of two wires (24, 26), comprising:
    an electrical oscillator stage (14) including a frequency setting capacitor (16);
    means (30, 32) for connecting a first (24) of said cable wires to a first side of said capacitor and the other (26) of said cable wires to the other side of said capacitor;
    means (18) for providing a voltage corresponding to the frequency of oscillation of the oscillator stage; and
    means (20) for displaying a visual representation of said voltage;
    wherein said oscillator stage (14) comprises:
    a comparator (40) having an output terminal (42), an inverting input terminal (44) and a non-inverting input terminal (46);
    first resistor means (48, 50) coupling said non-inverting input terminal to a first reference potential;
    second resistor means (52) coupling said non-inverting input terminal to a second reference potential higher than said first reference potential;
    third resistor means (54) coupling said non-inverting input terminal (46) to said output terminal (42);
    fourth resistor means (56) coupling said inverting input terminal (44) to said output terminal (42);
    means for coupling said capacitor first side to said inverting input terminal (44); and
    means for coupling said capacitor second side to said first reference potential.

2. The arrangement according to claim 1 further including:
    fifth resistor means (58) coupled to said output terminal (42); and
    a light emitting diode (60) connected between said fifth resistor means (58) and said second reference potential.

3. The arrangement according to claim 1 wherein said first resistor means (48, 50) includes a variable resistor (50) so that said arrangement can be calibrated.

4. The arrangement according to claim 1 wherein said displaying means (20) includes:
    a plurality of light emitting elements (82, 84, 86, 88, 90, 92) positioned in a linear array; and
    energizing means (70, 72, 74, 76, 78, 80, 94, 96, 98, 100, 102, 104, 106, 108) coupled to receive said voltage from said voltage providing means for selectively energizing said light emitting diodes to provide a bar of light extending in direct dependence on the length of the cable.

5. The arrangement according to claim 4 wherein said light emitting elements are light emitting diodes and said energizing means comprises:
    a plurality of comparators (70, 72, 74, 76, 78, 80) each having an output terminal, an inverting input terminal and a non-inverting input terminal;
    means for coupling the non-inverting input terminals of all of said plurality of comparators to receive said voltage from said voltage providing means (18);
    a plurality of resistors (96, 98, 100, 102, 104, 106, 108) connected in series between a first reference potential and a second reference potential, there being one more resistor in said plurality of resistors than there are comparators in said plurality of comparators;

means for connecting the inverting inputs of said plurality of comparators each to a respective junction between resistors in the series connection of said plurality of resistors; and means for connecting said plurality of light emitting diodes each between the output terminal of a respective one of said plurality of comparators and said second reference potential.

6. The arrangement according to claim 1 wherein said voltage providing means includes:

a one-shot multivibrator circuit (63) coupled to said oscillator stage (14); and an integrator circuit (66, 68) coupled to said one-shot multivibrator circuit.

7. The arrangement according to claim 1 wherein said arrangement is selectively powered from a battery (34) and said connecting means (30, 32) comprises means for completing a circuit path for said battery so that said connecting means operates as a power control switch for said arrangement.

8. The arrangement according to claim 7 wherein said connecting means includes:

a jack (30) having a first terminal and a second terminal;

means for connecting said first jack terminal to a first terminal of said battery (34);

means for connecting said second jack terminal to ground; and means (32) mating with said jack for connecting said first jack terminal to said second jack terminal.

* * * * *